United States Patent [19]

Myers et al.

[11] Patent Number: 5,322,820
[45] Date of Patent: Jun. 21, 1994

[54] ATHERMAL LASER GLASS COMPOSITIONS WITH HIGH THERMAL LOADING CAPACITY

[75] Inventors: John D. Myers; Shibin Jiang, both of Hilton Head Island, S.C.

[73] Assignee: Kigre, Inc., Hilton Head Island, S.C.

[21] Appl. No.: 986,946

[22] Filed: Dec. 8, 1992

[51] Int. Cl.$^5$ .......................... C03C 3/16; C03C 3/17; C03C 3/19
[52] U.S. Cl. ........................ 501/45; 501/47; 501/48; 252/301.4 P; 252/301.6 P
[58] Field of Search ............. 501/45, 47, 48; 252/301.4 P, 301.6 P

[56] References Cited

U.S. PATENT DOCUMENTS

| | | |
|---|---|---|
| 3,687,799 | 8/1972 | Spanoudis. |
| 4,022,707 | 5/1977 | Deutschbein et al. ........... 501/48 X |
| 4,075,120 | 2/1978 | Myers et al. ..................... 501/48 X |
| 4,248,732 | 2/1981 | Myers et al. ..................... 501/48 X |
| 4,333,848 | 6/1982 | Myers et al. ..................... 252/301.4 |
| 4,661,284 | 4/1987 | Cook et al. ....................... 501/47 X |
| 4,820,667 | 4/1989 | Tsunekawa et al. ............... 501/104 |
| 4,849,002 | 7/1989 | Rapp ................................ 65/30.13 |
| 4,871,230 | 10/1989 | Yamashita et al. .............. 350/96.34 |
| 4,929,387 | 5/1990 | Hayden et al. ................... 252/301.4 |
| 5,032,315 | 7/1991 | Hayden et al. ................... 252/301.4 |
| 5,053,165 | 10/1991 | Toratani et al. .................. 252/301.4 |
| 5,053,360 | 10/1991 | Myers et al. ......................... 501/48 |

Primary Examiner—Karl Group
Attorney, Agent, or Firm—Howard & Howard

[57] ABSTRACT

Phosphate glass compositions which exhibit both athermal behavior under high thermal loading and high thermal shock resistance without special conditioning. High gain, laser rods, discs and other optical elements formed of these phosphate glass compositions are also described.

4 Claims, No Drawings

ATHERMAL LASER GLASS COMPOSITIONS WITH HIGH THERMAL LOADING CAPACITY

FIELD OF THE INVENTION

The present invention relates generally to phosphate glasses and, more specifically, provides phosphate glass compositions which exhibit athermal behavior under high thermal loading and demonstrate high thermal shock resistance without special surface preparations such as ion-exchange strengthening, coatings, and/or polishing operations. The present invention also relates to optical quality phosphate glass articles such as laser rods, discs, and the like and to laser devices which incorporate these glass articles.

BACKGROUND OF THE INVENTION

It is well-known that laser glasses must be able co withstand high internal temperatures created by flash-lamps and the like without experiencing significant distortion, cracking or changes in optical properties that would significantly degrade the optical properties of the resonator during operation. Commonly referred to as thermal shock resistance, optical elements such as laser rods, slabs, discs, and fibers must also be capable of enduring high frequency and/or high average power optical pumping without catastrophic failure.

As will be appreciated by those skilled in the art, operation a laser glass element acquires heat from the pumping light source. In order to dissipate this heat, laser devices are typically liquid-cooled to maintain the laser glass element within its operating temperature range. This cooling of the laser element creates a thermal gradient resulting in thermally-induced stress within the element that in turn induces optical distortions. If the thermally-induced stress exceeds the rupture strength of the glass, catastrophic failure of the laser glass element occurs. It is also known that under repetitively pulsed or continuously pumped conditions, conventional phosphate laser glass fractures and/or exhibits optical distortion at relatively low power levels which severely restricts the range of applications for these materials. Typically, athermal phosphate laser glass compositions have low rupture strength. This limits their use to average power levels of about 50% of that which may be employed with silicate glass compositions. Although their high rupture strength is desirable, silicate laser glass compositions do not compare favorably with athermal phosphate laser glass compositions in two respects: (1) silicate glass compositions have lower gain than the phosphate laser glass compositions; and (2) silicate glass compositions are not athermal. Moreover, these limitations of silicate glasses combine to effectively restrict their use to power levels comparable to those utilized with in phosphate laser glass compositions, notwithstanding that the silicates demonstrate twice the rupture strength.

Efforts to improve the rupture strength of both silicate and phosphate laser glasses by ion-exchange methods are discussed U.S. Pat. Nos. 3,687,799 and 5,053,360 which have been assigned to the assignee of the present invention. The methods of improving rupture strength described therein have found important uses, but the resultant glasses are limited in some applications by optical constraints due to the presence of a compressive surface layer. It is known that the compressive surface layer has a highly reflective internal surface that adversely affects performance and manufacturing costs.

The present invention provides phosphate glass compositions which satisfy the need for athermal performance at high average power levels with the concurrent high rupture strength, high gain, and good chemical durability necessary for superior performance without the need for ion exchange or other surface treatment methods which may degrade performance and increase cost.

Other patents which disclose phosphate glass compositions are U.S. Pat. Nos. 5,053,165 (Oct. 1, 1991); 5,032,315 (Jul. 16, 1992); 4,929,387 (May 29, 1990); 4,871,230 (Oct. 3, 1989); 4,820,662 (Apr. 11, 1989); 4,333,848 (Jun. 8, 1992); and 4,022,707 (May 10, 1977). None of these patents, however, disclose the laser glass compositions of the present invention having the unexpected properties described herein.

SUMMARY OF THE INVENTION

In accordance with one aspect of the present invention, there are provided phosphate glass compositions which demonstrate at high average power operation an unexpected balance of athermal performance, high gain, and high rupture strength. These glasses also exhibit good chemical durability. These desirable characteristics act synergistically to provide significantly improved over-all performance in comparison with conventional laser glasses.

Preferably, the phosphate glass compositions of the present invention are a mixture of $P_2O_5$, $X_2O_3$ (where X is selected from the group consisting of Al, B, Yb, La, Ce, Pr, Nd, Pm, Sm, Eu, Gd, Tb, Dy, Ho, Er, Tm, Lu, and combinations thereof); $R_2O$ (where R is selected from the group consisting of Li, Na, K, and combinations thereof); and MO (where M is selected from the group consisting of Be, Mg, Ca, St, Ba, Zn, and combinations thereof). In this particular embodiment, the preferred concentrations of the components in mole percentage are from about 60% to about 70% $P_2O_5$, from about 14% to about 30% $X_2O_3$, from about 5% to about 20% $R_2O$, and from about 0% to about 5% MO. The laser glasses of the above compositions are preferably doped with the following laser ions in an amount effective to sustain laser activity: neodymium, holmlure, erblum, dysprosium, samarium, europium, terbium, thulium, ytterbium, cerium, copper and chromium and combinations thereof.

Due to the afore-described athermal performance and high rupture strength, the phosphate glass compositions of the present invention are uniquely suited for use in forming optical quality phosphate glass articles such as laser rods, discs, slabs, fibers, and the like.

In still another aspect, the present invention provides optical elements formed of the phosphate glass compositions of the present invention.

Thus, it is an object of the present invention to provide phosphate-based laser glass compositions which can be operated at high-average power levels while maintaining superior performance characteristics.

It is also an object of the present invention to provide phosphate glass compositions suitable for laser applications which are athermal at high-average power operation.

It is still further an object of the present invention to provide athermal phosphate glass compositions which have high rupture strength.

It is still further an object of the present invention to provide laser glass compositions which demonstrate a balance of athermal performance, high gain and high rupture strength which are ideal for high average power operation.

These and other objects, advantages and features of the present invention will become more fully apparent in connection with the following detailed description of the preferred embodiments of the invention.

DETAIL DESCRIPTION OF THE PREFERRED EMBODIMENTS OF THE INVENTION

In one preferred embodiment, the phosphate glass compositions of the present invention contain $P_2O_5$, $X_2O_3$ (where X is selected from the group consisting of Al, B, Yb, La, Ce, Pt, Nd, Pm, Sm, Eu, Gd, Tb, Dy, Ho, Er, Tm, Lu, and combinations thereof) and $R_2O$ (where R is selected from the group consisting of Li, Na, K, and combinations thereof). The preferred concentrations of these components in the phosphate glass compositions of the present invention in the broadest aspect which provide laser glasses having good athermal performance, high rupture strength, high gain and good chemical durability, are set forth in Table I below.

TABLE I

|  | (Mole %) |
|---|---|
| $P_2O_5$ | 60–70 |
| $X_2O_3$ | 14–30 |
| $R_2O$ | 5–20 |

As will be appreciated by those skilled in the art, the preferred phosphate glass compositions of the present invention also include a suitable lasing dopant. The preferred dopants in the present invention are those which provide one or more of the following lasing elements: neodymium, holmium, erbium, dysprosium, samarium, europium, terbium, thulium, ytterbium, cerium, copper and chromium and combinations thereof. In most applications an effective amount of dopant will be from about 0.01 mole percent to about 8.0 mole percent and will be added in the form of the oxide.

Although the ranges of concentrations for the components of the present invention set forth in Table I provide high-quality phosphate laser glasses having the desired characteristics of athermal performance, high rupture strength and high gain, it has been found that the concentration ranges set forth in Table II below provide excellent laser glasses having an unexpected balance of the desired characteristics:

TABLE II

|  | (Mole %) |
|---|---|
| $P_2O_5$ | 64–67 |
| $X_2O_3$ | 13–28 |
| $R_2O$ | 8–20 |
| dopant | 0.01–8.0 |

In addition to the above-described compositions, the present invention provides variations of these compositions which also exhibit the desired characteristics at high-average power operation. These compositions are prepared by adding to the above compositions from about 0.0 mole percent to about 5.0 mole percent MO, where M is selected from the group consisting of Be, Mg, Ca, St, Ba, and Zn. Thus, in this embodiment, the preferred laser glass compositions are those set forth in Table III below.

TABLE III

|  | (Mole %) |
|---|---|
| $P_2O_5$ | 60–70 |
| $X_2O_3$ | 14–30 |
| $R_2O$ | 5–20 |
| MO | 0–5 |
| dopant | 0.01–8 |

In a more preferred embodiment, one which provides phosphate laser glasses that may be particularly suitable in some applications, the range of concentrations of the preferred components are as set forth in Table IV below:

TABLE IV

|  | (Mole %) |
|---|---|
| $P_2O_5$ | 64.5–66.8 |
| $X_2O_3$ | 14.7–28 |
| $R_2O$ | 8.3–20 |
| MO | 0–3 |
| dopant | 0.5–6 |

Of course, throughout this application, the elements designated by the variables X, R, and M are as previously described.

In a more preferred embodiment, the present invention provides specific phosphate glass compositions which by virtue of a synergistic interaction of ingredients and concentrations, have optimum athermal performance and high rupture strength at high average power operating levels. These high-performance phosphate glass compositions can be described generally as those containing $P_2O_5$, $B_2O_3$, $Al_2O_3$, $La_2O_3$, either $K_2O$, $Li_2O$, or $Na_2O$ and an appropriate lasing dopant. In the broadest aspect, these unique laser glass formulations are based on the concentrations set forth in Table V.

TABLE V

|  | (Mole %) |
|---|---|
| $P_2O_5$ | 60–70 |
| $B_2O_3$ | 0–20 |
| $Al_2O_3$ | 1–20 |
| $La_2O_3$ | 0–15 |
| $K_2O$, $Li_2O$ or $Na_2O$ | 7–22 |
| MO | 0–5 |
| dopant | 0.5–8.0 |

More preferred concentration ranges are set forth in Table VI.

TABLE VI

|  | (Mole %) |
|---|---|
| $P_2O_5$ | 61–67 |
| $B_2O_3$ | 1.0–11 |
| $Al_2O_3$ | 7–16 |
| $La_2O_3$ | 0.5–15 |
| $K_2O$ or $Li_2O$ | 8–20 |
| dopant | 3–6 |

A particularly preferred compositions is approximately 65.3 mole % $P_2O_5$, 16.7 mole % $X_2O_3$, and 18 mole % $Li_2O$ with an effective amount of a lasing agent. The most preferred dopants in these systems is $Nd_2O_3$.

It will be appreciated, then, that in one preferred embodiment of the present invention, the phosphate glass compositions of the present invention comprise a phosphate base of $P_2O_5$ to which there is added at least two and, preferably, at least three separate compounds from the previously described class $X_2O_3$, most preferably along with $K_2O$ or $Li_2O$. One particularly preferred $X_2O_3$ compound is $Al_2O_3$. Again a lasing dopant is also included in the mixture. Therefore, the present invention provides in one embodiment a phosphate laser glass which contains $P_2O_5$, $K_2O$ and a three part mixture of $X_2O_3$ as set forth in Table VII below where $X_2O_3$ (I-III) represents three distinct $X_2O_3$ compositions:

TABLE VII

| | (Mole %) |
|---|---|
| $P_2O_5$ | 60-70 |
| $X_2O_3$ (I) | 0.1-29.8 |
| $X_2O_3$ (II) | 0.1-29.8 |
| $X_2O_3$ (III) | 0.1-29.8 |
| | [$X_2O_3$ I-III not exceeding about 30% total] |
| $K_2O$ or $Li_2O$ | 5-20 |
| dopant | 0.1-8 |

It is to be understood that additives such as solarization inhibitors (e.g., $Nb_2O_3$ and $Sb_2O_3$) may also be present in the phosphate glass compositions of the present invention where desirable and the appended claims contemplate as excluded. Solarization inhibitors may comprise from about 0.01 mole percent to about 5.0 mole percent of the final composition. It should also be recognized that it may be suitable to add one or more of the components of the present invention to the melt as a complex to reduce material loss during processing (e.g. $Ba(PO_3)_3$) or the like). Also, in some instances the fluoride equivalent of a particular oxide may be suitable.

In terms of preparation, conventional techniques may be used. For example, the raw materials may be added to a quartz crubicle where they are initially melted. The melt may then be homogenized and refined in a platinum crucible. The molten glass is then cast using standard techniques and annealed.

In summary, as described above, the phosphate laser glasses of this invention have a high gain, providing the most efficient operation possible, athermal behavior, providing constant beam divergence, good durability, permitting water cooling, and high thermal loading. Laser rods formed from these glass compositions are temperature stable, even under high thermal loading and provide excellent gain at a relatively low lasing threshold.

The following examples are in no manner intended to limit the breadth of the present invention as set forth in the appended claims, but rather are provided to further illustrate the features and numerous advantages of the invention.

| | Example No. | | | | | | | | | | | | |
|---|---|---|---|---|---|---|---|---|---|---|---|---|---|
| | 1 (Bp68 No. 1) | 2 (No. 2) | 3 (Bp69) | 4 (Bp70) | 5 (Bp71) | 6 (Bp72) | 7 (Bp73) | 8 (Bp74) | 9 (Bp75) | 10 (Bp76) | 11 (Bp77) | 12 (Bp78) | 13 (Bp79) |
| $P_2O_5$ (mole %) | 65.3 | 65.3 | 65.3 | 64.8 | 64.8 | 64.8 | 64.8 | 65.3 | 65.3 | 65.3 | 65.3 | 65.3 | 65.3 |
| $B_2O_3$ (mole %) | 3 | 3 | 1 | 10.2 | 10.2 | 10.2 | 10.2 | 8.1 | 5.1 | 3 | 3 | 3 | 3 |
| $Al_2O_3$ (mole %) | 15.2 | 15.2 | 15.2 | 9 | 7.0 | 9 | 9.0 | 8.0 | 9.0 | 15.2 | 15.2 | 15.2 | 12.9 |
| $La_2O_3$ (mole %) | 0.8 | 0.8 | 0.8 | 2.8 | 2.3 | 2.8 | <.8 | 15.2 | 7.0 | 0.8 | 0.8 ($Na_2O$) | 0.8 ($Li_2O$) | ($Na_2O$) |
| $K_2O$ (mole %) | 15.7 | 15.7 | 17.7 | 13.2 | 15.7 | 13.2 | 13.2 | 10.7 | 13.7 | 15.7 | 15.7 | 15.7 | 18 |
| $Nd_2O_3$ (wt. %) | 3.0 | 3.0 | 3.0 | 6.0 | 3.4 | 4.5 | 3.0 | 3.0 | 3.0 | 3.28 | 3.0 | 3.0 | 3.0 |
| $Nb_2O_5$ (wt. %) | 1.0 | 1.0 | 1.0 | 1.0 | 1.0 | 1.0 | 1.0 | 1.0 | 1.0 | 1.0 | 1.0 | 1.0 | 1.0 |
| $Sb_2O_3$ (wt. %) | 0.5 | 0.5 | 0.5 | 0.5 | 0.5 | 0.5 | 0.5 | 0.5 | 0.5 | 0.5 | 0.5 | 0.5 | 0.5 |
| output at | | | | | | | | | | | | | |
| 40 J input (mJ) | 740 | 776 | 749 | 803 | 766 | | 571 | 738 | 659 | 704 | 788 | 790 | 666 |
| 45 J input (mJ) | 830 | 865 | 844 | 920 | 870 | | 646 | 838 | 741 | 811 | 890 10.8— | 884 | 748 |
| maximum output power (W) | 9.6 | 10.2 | 9.9 | 9.4 | 9.9 | | 7.4 | 7.7 | 7.3 | 10.6 | 11.4 | 10.6 | 9.7 |
| maximum thermal loading | >1100 | >1100 | 605 | 550 | 660 | | 605 | 495 | 495 | 1045 | >1100 | >1100 | >1100 |
| T % at 2200 microns | 68.2% | 70% | 67% | 81% | 62% | 79% | 80.2% | 82% | | 66.6% | 70% | 73.4% | |

| | Example No. | | | | | | | | | |
|---|---|---|---|---|---|---|---|---|---|---|
| | 14 (Bp80) | 15 (Bp81) | 16 (Bp82) | 17 (Bp83) | 18 (Bp84) | 19 (Bp85) | 20 (Bp86) | 21 (Bp87) | 22 (Bp88) | 23 (Bp89) |
| $P_2O_5$ (mole %) | 65.3 | 65.3 | 65.3 | 65.3 | 65.3 | 65.3 | 64.5 | 64.8 | 65 | |
| $B_2O_3$ (mole %) | 1 | 3 | 3 | 3 | 3 | 3 | 3 | 3 | 3 | 4 |
| $Al_2O_3$ (mole %) | 12.9 | 15.2 | 12.9 | 12.9 | 15.2 | 14.2 | 14.2 | 14.2 | 14.2 | |
| $La_2O_3$ (mole %) | 0.8 ($Li_2O$) | 0.8 | 0.8 ($Na_2O$) | 0.8 ($Li_2O$) | 0.8 | 0.8 ($Li_2O$) | 0.8 ($Li_2O$) | 1.0 ($Li_2O$) | 0.8 ($Li_2O$) | |
| $K_2O$ (mole %) | 20 | 15.7 | 18 | 18 | 15.7 | 16.7 | 17.5 | 17.0 | 16 | |
| $Nd_2O_3$ (wt. %) | 3.0 | 3.0 | 3.0 | 3.0 | 3.0 | 3.0 | 3.0 | 3.0 | 3.0 | |
| $Nb_2O_5$ (wt. %) | 1.0 | 1.0 | 1.0 | 1.0 | 1.0 | 1.0 | 1.0 | 1.0 | | |
| $Sb_2O_3$ (wt. %) | 0.5 | 0.5 | 0.5 | 0.5 | 0.5 | 0.5 | 0.5 | 0.5 | 0.5 | |
| output at | | | | | | | | | | |
| 40 J input (mJ) | 716-756 | 723 | 638 | 881 | | 768 | 758 | 775 | 704 | |
| 45 J input (mJ) | 835 | 808 | 722 | 985 | | 850 | 881 | 873 | 800 | |
| maximum output power (W) | 10.6 | 10.3 | 9.7 | 11.2 | | 10.4 | 10.3 | 10.3 | 9.4 | |
| maximum thermal loading | >1100 | >1100 | 605 | >1100 | | >1100 | >1100 | >1100 | >1100 | |
| T % at 2200 microns | | 67.4% | | 68.3% | 83% | | 72% | 72% | 70.3 | 74.5 |

| | Example No. | | | | | | | | | | | |
|---|---|---|---|---|---|---|---|---|---|---|---|---|
| | 24 (Bp56) | 25 (Bp57) | 26 (Bp58) | 27 (Bp59) | 28 (Bp60) | 29 (Bp61) | 30 (Bp62) | 31 (Bp63) | 32 (Bp64) | 33 (Bp65) | 34 (Bp66) | 35 (Bp67) |
| $P_2O_5$ (mole %) | 66.8 | 66.8 | 64.8 | 65.6 | 65.6 | 65.6 | 65.3 | 64.8 | 65.3 | 61.3 | 65.3 | 60 |
| $B_2O_3$ (mole %) | 10.2 | 10.2 | 10.2 | 8.3 | 4.1 | 9.2 | 5.1 | 10.2 | 8.5 | 8.1 | 10.5 | 9 |
| $Al_2O_3$ (mole %) | 3 | 5.0 | 7.0 | 8.3 | 15.3 | 10.2 | 15.2 | 9.0 | 15.2 | 15.2 | 15.2 | 15 |

-continued

|  |  |  |  |  |  |  |  |  |  |  |  |
|---|---|---|---|---|---|---|---|---|---|---|---|
| $La_2O_3$ (mole %) | 4.8 | 4.8 | 4.8 | 0.3 | 0.3 | 0.3 | 0.8 | 2.8 | 0.4 | 4.8 | 0.8 | 3 |
| $K_2O$ (mole %) | 15.2 | 13.2 | 13.2 | 13.7 | 13.7 | 13.7 | 13.7 | 13.2 | 10.5 | 10.7 | 8.3 | 13 |
| MgO (mole %) |  |  |  | 2.0 | 1 | 1 |  |  |  |  |  |  |
| $Nd_2O_3$ (wt. %) | 3.0 | 3.0 | 3.0 | 4.5 | 4.5 | 4.5 | 3 | 3.0 | 3.0 | 3.0 | 3.0 | 3.0 |
| $Nb_2O_5$ (wt. %) | 1.0 | 1.0 | 1.0 | 1.0 | 1.0 | 1.0 | 1.0 | 1.0 | 1.0 | 1.0 | 1.0 | 1.0 |
| $Sb_2O_3$ (wt. %) | 0.5 | 0.5 | 0.5 | 0.5 | 0.5 | 0.5 | 0.5 | 0.5 | 0.5 | 0.5 | 0.5 | 0.5 |
| output at |  |  |  |  |  |  |  |  |  |  |  |  |
| 40 J input (mJ) | 875 | 684(784) | 790 | 961 | 928 | 795 | 631(729) | 745 | 704 | 572 | 672 |  |
| 45 J input (mJ) | 1000 | 771(882) | 889 | 1079 | 1035 | 805 | 716(840) | 841 | 803 | 647 | 751 |  |
| maximum output power (W) | 8.7 | 9.38 | 9.72 | 11.2 | 0.2 | 10.5 | 10.3 | 9.46 | 9.76 | 7.5 | 8.13 |  |
| maximum thermal loading | 405 | >1045 | >1100 | 935 | 495 | 660 | >1300 | >1100 | >1100 | >1100 | >1100 |  |
| T % at 2200 microns | 43.5% |  |  | 73.0% | 57.6% | 57.6% | 66.6 | 67% | 75% | 78% | 72% |  |

| | Example No. | | | | | | | | | | | |
|---|---|---|---|---|---|---|---|---|---|---|---|---|
| | 36 (Bp78) | 37 (Bp80) | 38 (Bp83) | 39 (Bp85) | 40 (Bp86) | 41 (Bp87) | 42 (Bp88) | 43 (Bp89) | 44 (Bp83HM2) | 45 (Bp83HM4) | 46 (Bp83HM6) | 47 (Bp83HM7) |
| $P_2O_5$ (mole %) | 65.3 | 65.3 | 65.3 | 65.3 | 64.5 | 64.8 | 65 | 64.8 |  |  |  |  |
| $B_2O_3$ (mole %) | 3 | 1 | 3 | 3 | 3 | 3 | 4 | 3 |  |  |  |  |
| $Al_2O_3$ (mole %) | 15.2 | 12.9 | 12.9 | 14.2 | 14.2 | 14.2 | 14.2 | 14.2 |  |  |  |  |
| $La_2O_3$ (mole %) | 0.8 | 0.8 | 0.8 | 0.8 | 0.8 | 1.0 | 0.8 | 1.0 |  |  |  |  |
| $Li_2O$ (mole %) | 15.7 | 20 | 18 | 16.7 | 17.5 | 17.0 | 16 | 17.0 |  |  |  |  |
| $Nd_2O_3$ (wt. %) | 3.0 | 3.0 | 3.0 | 3.0 | 3.0 | 3.0 | 3.0 | 3.0 | 3.0 | 5.0 | 9.0 | 3.0 |
| output at 45 J input (mJ) | 884 | 835 | 985 | 850 | 881 | 873 | 800 | 847 | 896 | 1031 | 1052 | 862 |
| output at 55 J input (mJ) [2 Hz] | 1064 | 1122 | 1180 | 1034 | 1060 | 1071 | 969 | 1021 | 1103 | 1230 | 1311 | 1042 |
| maximum thermal loading pulsed laser system | >1100 | >1100 | >1100 | >1100 | >1100 | >1100 | >1100 | >1100 | >1100 |  | 770 | >1100 |
| CW laser system | 1180 | 1078 | 980 |  |  |  |  |  |  |  |  |  |
| $P_2O_5$ | 65.3 | 65.3 | 65.3 | 65.3 | 64.5 | 64.8 | 65 | 64.8 | 65.3 | 65.3 | 65.3 | 65.3 |
| $X_2O_3$ | 19 | 14.7 | 16.7 | 18 | 18 | 18.2 | 19 | 18.2 | 16.7 | 16.7 | 16.7 | 16.7 |
| $R_2O$ | 15.7 | 20 | 18 | 16.7 | 17.5 | 17.0 | 16 | 17.0 | 18 | 18 | 18 | 18 |
| $P_2O_5$ | 64.5~65.3 |  | $X_2O_3$ 14.7~19 | $R_2O$ | 15.7~20 |  |  |  |  |  |  |  |

We claim:

1. A phosphate laser glass composition consisting essentially of the following components, by mole percent:

from about 60 to 70 percent $P_2O_5$;

from about 14 to about 30 percent of a mixture of $Al_2O_3$ and a member selected from the group consisting of: $La_2O_3$, $B_2O_3$, and combinations thereof;

from about 5 to about 20 percent $R_2O$, where R is selected for the group consisting of Li, Na, K and combinations thereof;

from about 0 to about 5 percent MO where M is selected from the group consisting of Be, Mg, Ca, Sr, Ba, Zn, and combinations thereof; and from about 0.01 to about 8.0 percent of a lasing dopant selected from the group consisting of Nd, Ho, Pr, Dy, Sm, Eu, Tb, Tm, Yb, Ce, Cu, Cr, and combinations thereof.

2. A combination as in claim 1, further including about 0.01 to bout 5.0 percent of a solarization inhibitor selected from the group consisting $Nb_2O_3$, $Sb_2O_3$, and combinations thereof.

3. A phosphate laser glass composition consisting essentially of the following components, in mole percent:

from about 60 to about 70 percent $P_2O_5$;

from about 14 to about 30 percent of a mixture of $Al_2O_3$, $La_2O_3$ and $B_2O_3$;

from about 5 to about 20 percent $R_2O$, where R is selected from the group consisting of $L_i$, Na, K and combinations thereof;

from about 0 to about 5 percent MO where M is selected from the group consisting Be, Mg, Ca, Sr, Ba, Zn and combinations thereof; and from about 0.01 to about 8.0 percent of a lasing dopant selected from the group consisting of Nd, Ho, Er, Dy, Sm, Eu, Tb, Tm, Yb, Ce, Cu, Cr, and combinations thereof.

4. A composition as in claim 3, further including 0.01 mole percent to about 5.0 mole of a solarization inhibitor selected from the group consisting of: $Nb_2O_3$, $Sb_2O_3$, and combinations thereof.

* * * * *

UNITED STATES PATENT AND TRADEMARK OFFICE
CERTIFICATE OF CORRECTION

PATENT NO.    : 5,322,820
DATED         : June 21, 1994
INVENTOR(S)   : John D. Myers and Shibin Jiang It is certified that error appears in the above-identified patent and that said Letters Patent is hereby corrected as shown below:

Column 1,
Line 19, delete "co" and insert therefore -- to --.
Line 30, prior to "operation" insert -- in --.
Line 62, after "discussed" insert -- in --.

Column 2,
Line 38, delete "St" and insert therefore -- Sr --.
Line 46, delete "holmlure" and insert therefore -- holmium --.
Line 47, delete "erblum" and insert therefore --erbium --.

Column 3,
Line 11, delete "DETAIL" and insert therefore -- DETAILED --.
Line 16, delete "Pt" and insert therefore -- Pr --.
Line 39, delete "neodymiun" and insert therefore -- neodymium --.
Line 68, delete "St" and insert therefore -- Sr --.

Column 4,
Line 62, delete "compositions" and insert therefore -- composition --.

Column 6,
Line 9, delete "crubicle" and insert therefore -- crucible --.

Column 7,
Line 54, delete "for" and insert therefore -- from --.
Line 61, delete "Pr" and insert therefore -- Er --.
Line 64, delete "bout" and insert therefore -- about --.

UNITED STATES PATENT AND TRADEMARK OFFICE
CERTIFICATE OF CORRECTION

PATENT NO. : 5,322,820
DATED : June 21, 1994
INVENTOR(S) : John D. Myers and Shibin Jiang It is certified that error appears in the above-identified patent and that said Letters Patent is hereby corrected as shown below:

Column 8,
Line 42, after "consisting" insert -- of --.
Line 51, delete "$L_i$" and insert therefore -- Li --.

Signed and Sealed this

Twenty-ninth Day of October, 2002

Attest:

Attesting Officer

JAMES E. ROGAN
Director of the United States Patent and Trademark Office

(12) REEXAMINATION CERTIFICATE (4316th)
United States Patent
Myers et al.

(10) Number: US 5,322,820 C1
(45) Certificate Issued: Apr. 24, 2001

(54) ATHERMAL LASER GLASS COMPOSITIONS WITH HIGH THERMAL LOADING CAPACITY

(75) Inventors: John D. Myers; Shibin Jiang, both of Hilton Head Island, SC (US)

(73) Assignee: Kigre, Inc., Hilton Head Island, SC (US)

Reexamination Request:
No. 90/005,779, Jul. 31, 2000

Reexamination Certificate for:
Patent No.: 5,322,820
Issued: Jun. 21, 1994
Appl. No.: 07/986,946
Filed: Dec. 8, 1992

(51) Int. Cl.[7] ............... C03C 3/16; C03C 3/17; C03C 3/19
(52) U.S. Cl. ............... 501/45; 501/47; 501/48; 252/301.4 P; 252/301.6 P
(58) Field of Search ............... 501/45, 47, 48; 252/301.4 P, 301.46

(56) References Cited

U.S. PATENT DOCUMENTS

| | | | |
|---|---|---|---|
| 3,580,859 | * | 5/1971 | Buzhinsky et al. ............ 252/301.4 P |
| 4,217,382 | * | 8/1980 | Torarani ........................ 252/301.4 P |

FOREIGN PATENT DOCUMENTS 2217334A   8/1990   (JP).

OTHER PUBLICATIONS

Chemical Abstracts citation 1992:71114, Boutinaud et al, "Fluorescent Properties of Copper (1+) Ion in Borate and Phosphate Glasses", Proc. SPIE–Int. Soc. Opt. Eng., 1590 (Submol. Glass Chem. Phys.), pp. 168–178, 1991.*

* cited by examiner

Primary Examiner—C. Melissa Koslow

(57) ABSTRACT

Phosphate glass compositions which exhibit both athermal behavior under high thermal loading and high thermal shock resistance without special conditioning. High gain, laser rods, discs and other optical elements formed of these phosphate glass compositions are also described.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *